United States Patent
Nys et al.

(10) Patent No.: US 8,915,242 B2
(45) Date of Patent: Dec. 23, 2014

(54) LAYERED CONSTRUCTION WITH TUBE SYSTEM

(75) Inventors: Manu Nys, Hove (BE); Johan Vermeiren, Sint-Maria-Aalter (BE); Kristof Vermeiren, Brasschaat (BE)

(73) Assignee: M=ECO² cvba, Aarstelaar (BE)

( * ) Notice: Subject to any disclaimer, the term of this patent is extended or adjusted under 35 U.S.C. 154(b) by 938 days.

(21) Appl. No.: 12/919,696

(22) PCT Filed: Feb. 26, 2009

(86) PCT No.: PCT/BE2009/000011
§ 371 (c)(1),
(2), (4) Date: Feb. 18, 2011

(87) PCT Pub. No.: WO2009/105846
PCT Pub. Date: Sep. 3, 2009

(65) Prior Publication Data
US 2011/0155121 A1 Jun. 30, 2011

(30) Foreign Application Priority Data
Feb. 26, 2008 (BE) .................................. 2008/0110

(51) Int. Cl.
*F24J 2/24* (2006.01)
*F24J 2/04* (2006.01)
(52) U.S. Cl.
CPC ................ *F24J 2/0438* (2013.01); *Y02B 10/20* (2013.01); *Y02E 10/44* (2013.01)
USPC ........... 126/651; 126/621; 126/656; 126/658; 126/662; 126/714

(58) Field of Classification Search
USPC .................. 126/621, 662, 651, 656, 658, 714
See application file for complete search history.

(56) References Cited

U.S. PATENT DOCUMENTS 3,430,912 A * 3/1969 Davis et al. .................... 248/499
3,590,111 A * 6/1971 Gebefugi ....................... 264/234
(Continued)

FOREIGN PATENT DOCUMENTS

AT 405175 B 6/1999
BE 897764 A * 1/1984
(Continued)

OTHER PUBLICATIONS

RD 227018 A Esso Societe Anonyme Francaise Solar energy collector Research Disclosure database No. 227018 Published in the Mar. 1983 paper journal.*

(Continued)

*Primary Examiner* — Jorge Pereiro
(74) *Attorney, Agent, or Firm* — Banner & Witcoff, Ltd.

(57) ABSTRACT

The present invention relates to a device for collecting and utilizing energy generated by the sun, comprising a layered construction provided with a substrate layer and a cover layer comprising a curable mortar, wherein there is arranged on the substrate layer a tube system through which a fluid can be transported in order to regulate the temperature in the tube system, this tube system being at least partially embedded in the mortar, and wherein the mortar of the cover layer comprises insulating granules, cement, water and additives. The invention further relates to a method for manufacturing a layered construction for a device for collecting and utilizing energy generated by the sun.

31 Claims, 3 Drawing Sheets

(56) References Cited

U.S. PATENT DOCUMENTS

| | | | | |
|---|---|---|---|---|
| 3,782,132 A | * | 1/1974 | Lohoff | 62/260 |
| 3,981,950 A | * | 9/1976 | Pletzer et al. | 264/109 |
| 4,120,131 A | * | 10/1978 | Carroll | 52/310 |
| 4,132,074 A | * | 1/1979 | Wendel | 60/641.8 |
| 4,245,621 A | * | 1/1981 | Hollobaugh | 126/621 |
| 4,257,481 A | * | 3/1981 | Dobson | 165/168 |
| 4,265,964 A | * | 5/1981 | Burkhart | 428/313.5 |
| 4,267,678 A | * | 5/1981 | Carroll | 52/309.12 |
| 4,267,822 A | * | 5/1981 | Diamond | 126/587 |
| 4,274,239 A | * | 6/1981 | Carroll | 52/443 |
| 4,280,484 A | * | 7/1981 | Mancosu | 126/621 |
| 4,293,341 A | * | 10/1981 | Dudley et al. | 106/675 |
| 4,349,398 A | * | 9/1982 | Kearns et al. | 156/71 |
| 4,398,529 A | * | 8/1983 | Schoenfelder | 126/620 |
| 4,398,960 A | * | 8/1983 | Murray | 106/738 |
| 4,507,901 A | * | 4/1985 | Carroll | 52/302.3 |
| 4,515,151 A | * | 5/1985 | Slemmons et al. | 126/709 |
| 4,548,007 A | | 10/1985 | Newman | |
| 4,572,864 A | * | 2/1986 | Benson et al. | 428/305.5 |
| 4,677,800 A | * | 7/1987 | Roodvoets | 52/309.12 |
| 4,712,338 A | * | 12/1987 | Trickel | 52/90.2 |
| 5,067,298 A | * | 11/1991 | Petersen | 52/742.14 |
| 5,284,712 A | * | 2/1994 | Kawai et al. | 428/454 |
| 5,598,682 A | * | 2/1997 | Haughian | 52/745.21 |
| 5,904,763 A | * | 5/1999 | Blocken | 106/696 |
| 5,931,381 A | * | 8/1999 | Fiedrich | 237/69 |
| 6,079,170 A | * | 6/2000 | Slebos | 52/220.1 |
| 6,220,523 B1 | * | 4/2001 | Fiedrich | 237/69 |
| 7,013,609 B2 | * | 3/2006 | Hydock | 52/220.1 |
| 7,040,066 B2 | * | 5/2006 | Fan | 52/309.12 |
| 7,600,943 B2 | * | 10/2009 | Serwin | 404/72 |
| 2003/0163965 A1 | * | 9/2003 | Hydock | 52/342 |
| 2004/0043682 A1 | * | 3/2004 | Taylor et al. | 442/42 |
| 2004/0200154 A1 | * | 10/2004 | Hunter, Jr. | 52/90.1 |
| 2007/0295827 A1 | * | 12/2007 | Kriens | 237/59 |
| 2008/0131830 A1 | * | 6/2008 | Nix | 432/220 |
| 2009/0025710 A1 | * | 1/2009 | Hogan | 126/652 |

FOREIGN PATENT DOCUMENTS

| Country | Number | | Date |
|---|---|---|---|
| CA | 2182176 C | | 1/2006 |
| CN | 1884694 A | * | 12/2006 |
| DE | 3205537 A1 | | 8/1983 |
| DE | 9401452 U1 | | 3/1994 |
| DE | 29620230 U1 | | 1/1997 |
| EP | 0095187 A | | 11/1983 |
| EP | 0590625 A | | 4/1994 |
| EP | 1256767 A | | 11/2002 |
| FR | 2817274 A | | 5/2002 |
| GB | 2054824 A | | 2/1981 |
| NL | 1007903 C2 | | 6/1999 |
| WO | 1999/034155 A1 | | 7/1999 |
| WO | WO 9934155 A1 | * | 7/1999 |

OTHER PUBLICATIONS

International Search Report and Written Opinion mailed Dec. 23, 2009(PCT/BE2009/000011); ISA/EP.

Database WPI Week 200628 Thomson Scientific, London, GB; AN 2006-264250 XP002498236 -& CN 1 673 166 A (Yuqiao Building Material Sci Tech Co Ltd Changzhou) Sep. 28, 2005.

Database WPI Week 200760 Thomson Scientific, London, GB; AN 2007-624965 XP002560073 -& CN 1 919 776 A (Univ Tai Yuan Technology) Feb. 28, 2007.

* cited by examiner

LAYERED CONSTRUCTION WITH TUBE SYSTEM

The present invention relates to a device for collecting and utilizing energy generated by the sun in an efficient, environmentally-friendly and sustainable manner, comprising a layered construction provided with a thermally insulating substrate layer and a cover layer comprising a curable mortar. The invention further relates to a method for manufacturing a layered construction for a device for collecting and utilizing energy generated by the sun.

The use of layered constructions with a view to thermal insulation of a space is generally known, for instance in the construction of flats roofs. The Belgian patent application no. 50599 thus describes an insulating roof covering with ventilation. In addition, panels are also known which serve as collectors for solar heat comprising channels containing a liquid heat-transporting medium. In these panels the solar heat is collected and transferred to the liquid medium. Such panels cannot however be used as substitute for a sufficiently strong and reliably insulated roof covering. A further problem with the known panels is that they substantially do not comprise any material that can retain the heat generated by the sun for a longer period of time, for instance overnight.

The present invention has for its object to provide a device according to the preamble, which device can moreover be integrated in simple manner into a building structure such as for instance a roof covering.

According to a first aspect, the present invention relates to a device according to the preamble, which device is distinguished in that there is arranged on the substrate layer a tube system through which a fluid can be transported in order to regulate the temperature in the tube system, this tube system being at least partially embedded in the mortar. Owing to the use of the mortar-embedded tube system the temperature can be regulated in simple manner while retaining the insulating function of the construction.

The term "mortar" must here preferably be understood to mean a preferably curable material suitable for embedding of the tube system, preferably comprising at least cement and water. The person with ordinary skill in the art will appreciate that other materials may also be suitable instead of such a mortar for the purpose of embedding the tube system.

According to a further aspect of the present invention, the substrate layer comprises thermally insulating elements, these elements preferably being embedded at least partially in a suitable substrate material, preferably a suitable mortar. These elements are preferably beam or panel-like and preferably have protruding parts in order to facilitate incorporation thereof in the substrate layer. These insulating elements improve the insulating properties of the substrate layer.

According to preferred embodiments of the present invention, the substrate layer comprises a substantially flat upper surface. This can simplify or enable the arranging of tubes, tube system and cover layer. The tube system can preferably be arranged on the upper surface of the substrate layer without sinking into this substrate layer or without sinking into pre-defined recesses in the substrate layer. Nor is it necessary to comprise or arrange a layer with high reflectivity, such as for instance an aluminium foil or similar foil, between the substrate layer and the mortar. Embodiments of the present invention further also comprise the advantages that they can withstand frost damage and condensation damage. A good adhesion between the cover layer and the substrate layer is also obtained in embodiments of the present invention.

According to a further aspect, a grid is arranged on the substrate layer in the layered construction, which grid preferably runs parallel to the substrate layer. The function of the grid consists substantially of simplifying placing of the tube system by securing the tube system in a suitable manner to the grid and of increasing the strength of the layered construction.

The tube system preferably comprises a continuous flexible tube in order to limit the chance of leakage of the fluid to a minimum. The tube system can further also be formed from a plurality of tubes joined together, preferably in watertight manner. The tube system preferably forms part of a closed liquid circuit and is watertight. In addition, the tube system is preferably connected to the grid. The tube system can further also increase the strength of the layered construction.

According to yet another further aspect of the present invention, at least one heat exchanger is connected to the tube system by means of suitable feed and/or discharge conduits in order to enable heat to be extracted from and supplied to the fluid in the tube system for the purpose of enabling regulation of the temperature in the tube system. At least one heat pump can also be connected in suitable manner to the tube system in order to recuperate the heat collected in the fluid.

According to yet another aspect of the invention, one or more storage vessels suitable for storing the fluid can be connected to the tube system by means of suitable feed and/or discharge conduits.

In another aspect of the invention means are connected to the tube system for the purpose of transporting the fluid. The fluid can be transported by means of for instance a suitable pump through the tube system and devices connected thereto.

According to a further aspect of the present invention, the layered construction can be part of a building structure, in particular an outside wall, a roof covering or a paving, wherein a finishing layer is applied to the cover layer. This finishing layer has the purpose of protecting the building structure in its normal function from external influences (such as for instance rain and wind) and/or providing an aesthetic finish. The finishing layer is preferably thin and preferably has a relatively limited heat resistance. Depending on the finishing layer, an air layer or a number of air channels can be provided between the cover layer and the finishing layer.

It is also an object of the present invention to provide a method for manufacturing a layered construction for a device for collecting and utilizing energy generated by the sun.

The layered construction is preferably placed at a location readily accessible to direct sunlight, oriented as far as possible toward the sun. The device can herein form part of a building structure in the form of a roof covering, an outside wall or a paving, such as for instance a driveway. The temperature in the layered construction, in particular of the mortar, can then be increased by solar radiation.

The temperature of the fluid can here then be increased substantially by thermal conduction from the heat-accumulating mortar which encloses the tube system to the fluid present therein. The advantage of using the mortar is that the heat can be retained therein for a long time, and can consequently also be generated to the fluid in the tube system for a long time. Even when there is no longer any direct sunlight shining on the device, heat can nevertheless still be generated to the fluid for a long period of time, for instance after sunset, due to the heat storage in the layered construction.

The device can be placed substantially vertically or substantially horizontally, or can be arranged at an incline. It is an advantage of embodiments of the present invention that the device is water-impermeable, this being particularly important when the device is placed horizontally during use.

The device according to embodiments of the present invention further also comprises the advantage that it can bear a substantial load without being damaged. Adult persons can thus walk on the upper surface of the device and move about thereon without damaging this device.

The invention will be further described with reference to the accompanying figures, which are not in any way intended to limit the scope of protection of the claims and in which:

Figure 1:
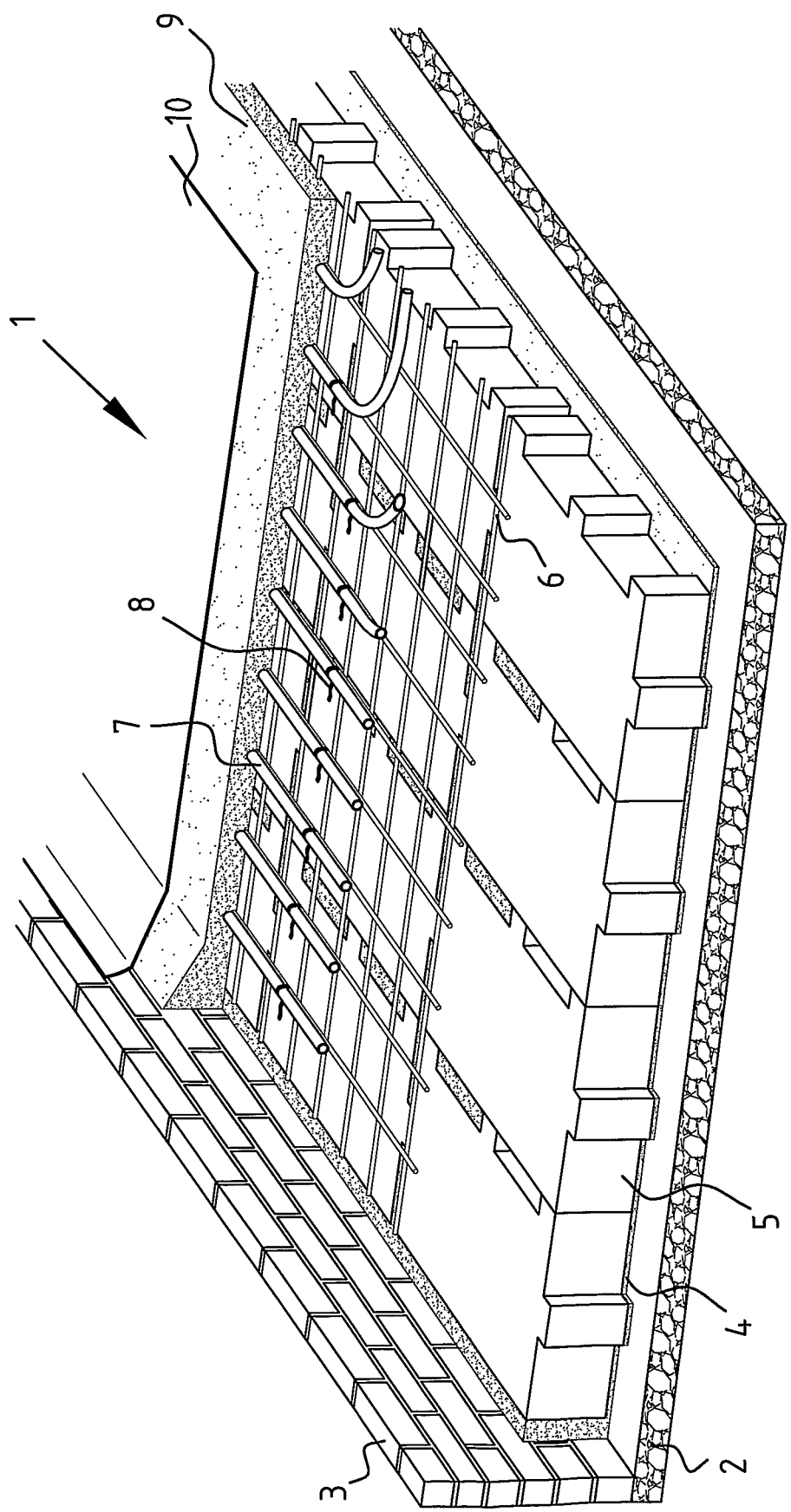
FIG. 1 shows a partly perspective section of a preferred embodiment of a layered construction according to the present invention on a ground surface, bounded on one side by an upright wall.

In the preferred embodiments shown in FIG. 1 a layered construction 1 is placed on a ground surface 2, consisting of for instance concrete, and flanked by an upright wall 3 formed by for instance a wall of bricks. The layered construction comprises a substrate layer made up of a suitable substrate material 4, preferably a curable mortar, and a plurality of thermally insulating elements 5.

The curable mortar preferably comprises insulating granules, cement, water and additives. The composition of the mortar is a further preferably chosen such that the mortar has at least thixotropic properties. The mortar preferably also has a high heat capacity combined with a coefficient of heat conductivity of preferably between about 0.05 and about 0.30 W/mK, more preferably between about 0.10 and about 0.25 W/mK, still more preferably between about 0.15 and about 0.20 W/mK, in order to have a balance between insulation and conductivity. The insulating granules are preferably chosen from expanded polystyrene granules, polyurethane granules, expanded polyurethane granules, preferably expanded vermiculite, preferably expanded perlite and combinations thereof.

In the preferred embodiment shown in FIG. 1 the substrate layer is further provided with thermally insulating elements 5 preferably formed from beam or panel-like blocks of insulation material having thermally insulating properties. Suitable materials for these thermally insulating elements comprise for instance expanded polystyrene, extruded polystyrene, polyurethane, expanded polyurethane and combinations thereof. Various other suitable thermally insulating materials are known to the person with ordinary skill in the art in this field. These thermally insulating elements optionally form part of the substrate layer.

Further arranged on top of the substrate layer in the embodiment of FIG. 1 is a grid 6 to which a tube system 7 is secured by means of metal or plastic strips or wires 8. According to a preferred embodiment, the grid is formed from suitable metal and/or suitable plastic. Examples of suitable metals are iron, aluminium, stainless steel and so forth. Examples of suitable plastics are polyethylene, polypropylene, polyvinyl chloride (PVC), glass fibre reinforcement or a composite of two or more of such materials, optionally combined with metal and so forth. Various other suitable materials are known to the person with ordinary skill in the art in this field. The grid can possibly consist of a plurality of parts or part-grids. Tube system 7 can be secured to grid 6 in various other suitable ways known to the person with ordinary skill in the art.

Various suitable materials from which the tube or tubes forming part of tube system 7 can be formed are known to the person with ordinary skill in the art in this field. Examples of suitable materials comprise polyethylene, medium-density polyethylene, high-density polyethylene, polypropylene, PVC, cross-linked polyethylene (PEX), metals such as copper and aluminium and so on. The tube or tubes can possibly also be formed from combinations of such materials. The tube or tubes can optionally be formed from multiple layers of various such materials.

In the embodiment shown in FIG. 1 the tube system 7 forming part of the layered construction is completely embedded in a cover layer 9 preferably formed from a curable mortar. The mortar forming part of cover layer 9 more preferably has a composition similar to the mortar forming part of the substrate layer. In the shown embodiment a finishing layer 10 is further applied over cover layer 9. This finishing layer 10 can lie at a distance relative to cover layer 9 in order to form an air layer or air channels.

Figure 3:
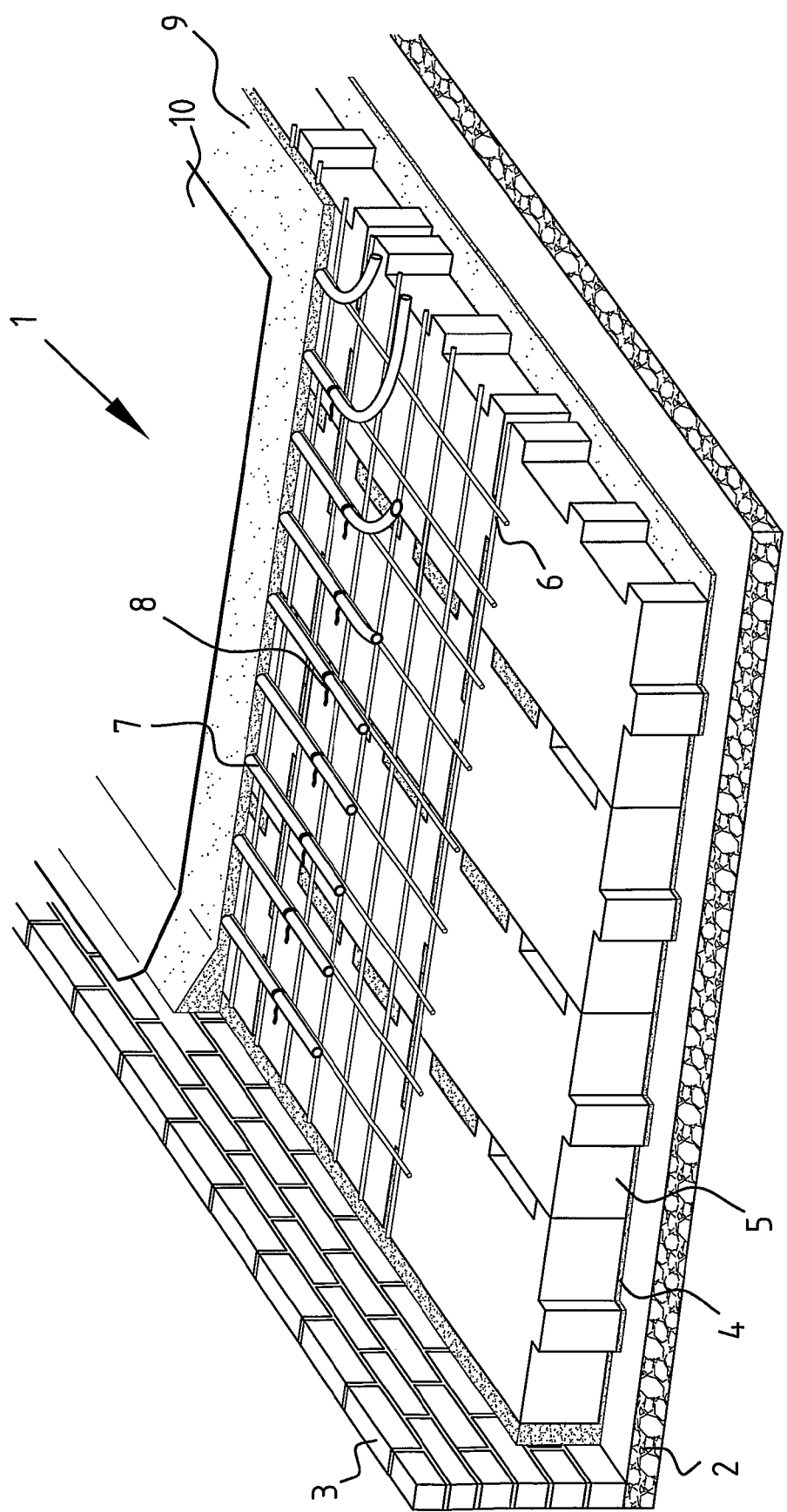
FIG. 3 shows a further preferred embodiment.

According to a more preferred embodiment (shown in FIG. 3), tube system 7 lies substantially flush with the outward facing surface of cover layer 9 and thus lies closer to finishing layer 10. This can be achieved for instance by levelling off the cover layer, after applying the cover layer material, on the tubes of the tube system so that the upper surface of the cover layer forms as it were a tangent plane on the top side of (the tubes of) the tube system. The heat can hereby be collected more efficiently by the fluid in tube system 7. When the finishing layer does not run parallel to the substrate layer, the tube system preferably runs substantially parallel to the finishing layer in order to obtain the highest possible efficiency in heat absorption by the fluid. The one or more tubes forming the tube system can have a diameter of for instance about 1, 2 or 3 cm. Higher and lower values for the diameter are also possible. The thickness of the finishing layer can for instance amount to about 2, 3, 4, 5 or 6 cm. Higher and lower values for the thickness of the cover layer are also possible.

The fluid must be suitable for absorbing, generating and transporting heat. The fluid is preferably non-toxic. A suitable fluid is for instance composed of water and one or more preferably non-toxic additives. These additives can for instance serve to prevent freezing of the fluid and/or to prevent corrosion. An example of a suitable non-toxic antifreeze agent is for instance polypropylene glycol.

The material of which finishing layer 10 consists is chosen substantially subject to the purpose of the device. The device can thus be placed for instance on flat roofs as well as sloping roofs. When the layered construction is arranged as part of a substantially flat roof (this is a roof with a maximum slope of about 5%) the finishing layer consists for instance of a prefabricated strip-like or tarpaulin-like waterproofing made up of one or more layers, such as for instance EPDM (Ethylene Propylene Diene Monomer) PVC, APP (Atactic Polypropylene)-modified bitumen, SBS (Styrene Butadiene Styrene)-modified bitumen and combinations thereof. When the device is placed as part of a sloping roof, the finishing layer can for instance consist of tiles, slates, metal panels, zinc strips and so forth. It will be apparent that various other materials are possible as finishing layer which are known to the person with ordinary skill in the art. The finishing layer is preferably thin and preferably has a relatively limited heat resistance of preferably <0.5 $m^2K/W$, more preferably <0.25 $m^2K/W$, still more preferably <0.1 $m^2K/W$, and most preferably <0.05 $m^2K/W$.

Figure 2:
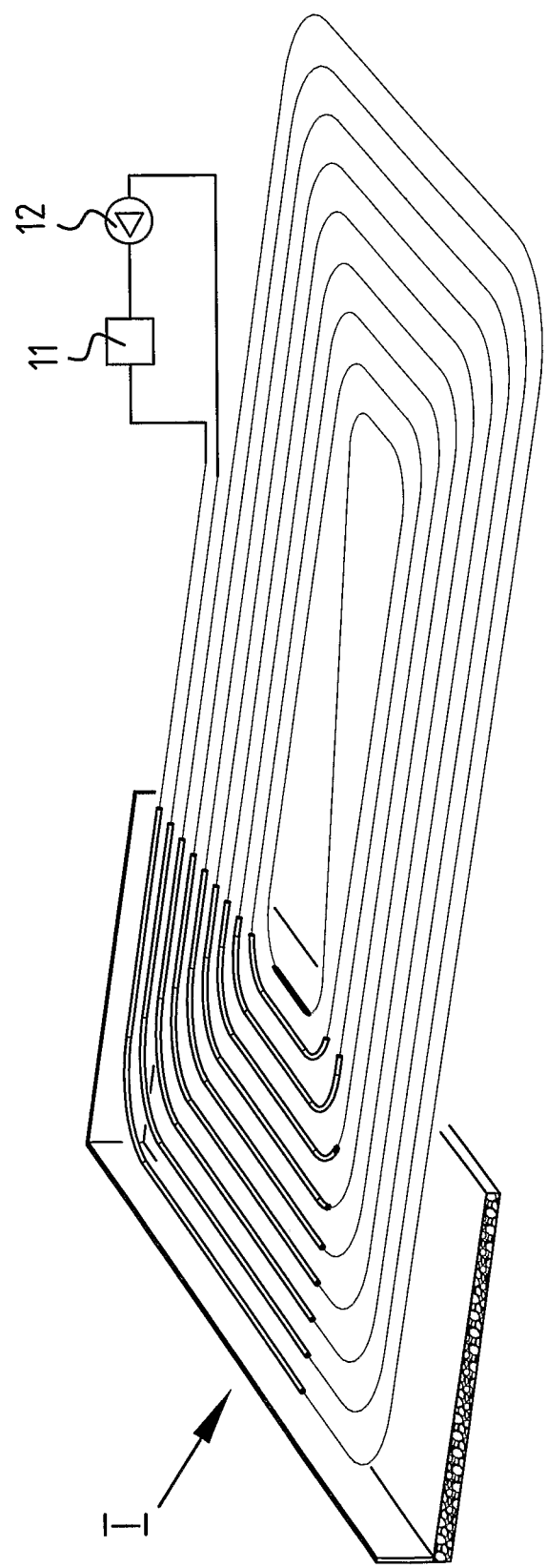
FIG. 2 shows a schematic outline of a preferred embodiment of the tube system as preferably closed liquid circuit according to the present invention.

FIG. 2 shows a schematic outline of a preferred embodiment of the tube system substantially of the device of FIG. 1, wherein numeral 11 refers to one or more heat exchanger(s), heat pump(s) and/or storage vessel(s) and other possible devices which can be connected by means of suitable feed and/or discharge conduits to the tube system. Means (12), such as for instance a pump, are also connected to the tube system in order to transport the fluid through the tube system and devices connected thereto.

Heat-generating devices can optionally also be connected to the tube system for the purpose of heating the fluid before it is transported through the tube system. In addition, the tube system can optionally also be connected in suitable manner to one or more classic panel-like solar collectors, with the object of preheating the fluid before it is carried through the solar collector.

The present invention also provides a method for manufacturing a layered construction for a device for collecting and utilizing energy generated by the sun, comprising of arranging a substrate layer on a suitable ground surface, such as for instance concrete or fibre cement sheets, arranging a tube system and arranging a cover layer. According to a preferred method, the substrate layer is manufactured by arranging a layer of a substrate material, preferably a curable mortar preferably comprising insulating material, subsequently placing thereon at a mutual distance elements of insulation material preferably preformed into blocks, and then filling the space between the blocks by means of a curable mortar preferably comprising insulating material.

According to a preferred method, after arranging of the substrate layer, the grid is placed on this layer, preferably parallel thereto. The tube system is then preferably arranged on the grid. The tube system is here preferably secured to the grid so that the tube system is displaced to only minimal extent during arranging of the cover layer. The cover layer is preferably then arranged by pouring or casting a curable mortar, whereby the tube system is further connected to the substrate layer and/or the grid. The tube system preferably lies substantially flush with the surface of the cover layer. A finishing layer can subsequently be further arranged on the cover layer.

The layered construction is preferably manufactured on a construction site. The advantage hereof is that it is then not necessary to work with separate panels, thereby reducing the chance of leakage or insufficient waterproofing of the device. Alternatively, the layered construction can be fabricated in the form of panels, optionally with the tube system or a part thereof integrated. The tube system or a part thereof and the grid or a part thereof can optionally be manufactured integrally in the factory and thus employed in the manufacture of a preferred embodiment of the device according to the present invention.

Since according to a preferred embodiment the part of the tube system intended for arrangement in the layered construction is at least partially embedded in the mortar, heat can still be generated to the fluid even for instance after solar radiation no longer impinges on the layered construction, since the heat can be held in the mortar for a long time.

An advantage of a preferred embodiment of the device according to the present invention is that the heat generated by the sun can be usefully employed in an efficient and economic manner, for instance to increase the temperature of a building structure, of a space or of a mass. This heat can for instance be utilized for a central heating system, to heat floors, to heat swimming pool water, to heat determined rooms in a building and so on.

A further advantage of a preferred embodiment of the device according to the present invention is that it can be used to control the temperature in a building structure of which the layered construction forms part. In advantageous manner the temperature in the layered construction in the building structure, and consequently also in spaces adjacent thereto, can thus be reduced if this is desirable by supplying fluid at a lower temperature to the layered construction and discharging fluid at a higher temperature therefrom. In this way heat can be discharged from for instance a roof covering in order to reduce the temperature of the roof construction, whereby the underlying space will be heated less quickly.

A further advantage of preferred embodiment of the device according to the present invention can consist of bringing the layered construction to a higher temperature during a colder period using the heat stored in the meantime. This results in a smaller difference in temperature between the outside of the building structure (so-called "heat loss area") and the indoor climate. This smaller temperature difference also results in a reduced energy loss from the indoor climate.

The invention claimed is:

1. Device for collecting and utilizing energy generated by the sun, said device comprising a layered construction provided with:
   a substrate layer comprising:
      a curable substrate mortar; and
      thermally insulating elements comprising a thermally insulating material placed at a mutual distance on the curable substrate mortar, wherein the thermally insulating elements have a plurality of protrusions located along a periphery of said thermally insulating elements;
   a tube system through which a fluid can be transported in order to regulate a temperature in the tube system, wherein the tube system is arranged on the substrate layer; and
   a cover layer comprising a curable cover layer mortar, wherein the curable cover layer mortar comprises insulating granules, cement, water and additives, said insulating granules comprising expanded vermiculite and expanded perlite;
   wherein the tube system is at least partially embedded in the curable cover layer mortar, the plurality of protrusions are positioned to create linear channels perpendicular to the substrate layer and the cover layer, the linear channels bridging between the curable substrate mortar and the curable cover layer mortar, and the linear channels being filled with the curable cover layer mortar.

2. Device as claimed in claim 1, wherein the tube system is largely or completely embedded in the curable cover layer mortar.

3. Device as claimed in claim 2, wherein the tube system lies substantially flush with an outward facing surface of the cover layer.

4. Device as claimed in claim 1, wherein the substrate layer is a thermally insulating substrate layer.

5. Device as claimed in claim 1, wherein the curable cover layer mortar has a coefficient of heat conductivity higher than about 0.10 W/mK.

6. Device as claimed in claim 1, wherein the insulating granules further comprise expanded polystyrene granules.

7. Device as claimed in claim 1, wherein the thermally insulating elements comprise blocks.

8. Device as claimed in claim 1, wherein the thermally insulating elements are embedded at least partially in the curable cover layer mortar.

9. Device as claimed in claim 8, wherein the thermally insulating elements are formed from at least one selected from the group consisting of expanded polystyrene, extruded polystyrene, polyurethane and combinations thereof.

10. Device as claimed in claim 1, wherein the thermally insulating elements are formed from at least one selected from the group consisting of expanded polystyrene, extruded polystyrene, polyurethane and combinations thereof.

11. Device as claimed in claim 1, wherein the tube system comprises a continuous flexible tube.

12. Device as claimed in claim 1, wherein the tube system comprises at least two tubes joined together.

13. Device as claimed in claim 1, wherein a grid running substantially parallel to the substrate layer is provided on the substrate layer.

14. Device as claimed in claim 13, wherein said grid is formed of a suitable plastic.

15. Device as claimed in claim 14, wherein said suitable plastic comprises polyethylene, polypropylene, polyvinyl chloride (PVC), glass fibre reinforcement or a composite of two or more of such materials.

16. Device as claimed in claim 15, wherein said grid further comprises metal.

17. Device as claimed in claim 13, wherein the tube system is connected to the grid.

18. Device as claimed in claim 1, wherein the device is a part of a roof covering, and wherein a finishing layer is applied to the cover layer.

19. Device as claimed in claim 18, wherein the finishing layer has a heat resistance of <0.5 $m^2K/W$, <0.25 $m^2K/W$, <0.1 $m^2K/W$, or <0.05 $m^2K/W$.

20. Device as claimed in claim 18, wherein an air layer or a number of air channels is provided between the cover layer and the finishing layer.

21. Device as claimed in claim 1, wherein at least one heat exchanger is connected to the tube system.

22. Device as claimed in claim 1, wherein at least one heat pump is connected to the tube system.

23. Device as claimed in claim 1, wherein at least one storage vessel is connected to the tube system.

24. Device as claimed in claim 1, wherein at least one means for transporting the fluid is connected to the tube system.

25. Method for manufacturing a layered construction for a device for collecting and utilizing energy generated by the sun, said method comprising:
   forming a substrate layer by;
      arranging a curable substrate mortar; and
         placing on the curable substrate mortar at a mutual distance thermally insulating elements comprising a thermally insulating material and having a plurality of protrusions located along a periphery of said thermally insulating elements;
   arranging on the substrate layer a tube system through which a fluid can be transported;
   arranging a cover layer on the substrate layer such that the tube system is at least partially embedded in the cover layer, the cover layer comprising a curable cover layer mortar, wherein the curable cover layer mortar comprises insulating granules, cement, water and additives, said insulating granules comprising expanded vermiculite and expanded perlite; wherein the plurality of protrusions located along a periphery of said thermally insulating elements create linear channels perpendicular to the substrate layer and the cover layer, the linear, the linear channels bridging between the curable substrate mortar and the curable cover layer mortar; and
   filling the linear channels with the curable cover layer mortar.

26. Method as claimed in claim 25, wherein arranging the cover layer on the substrate layer further comprises embedding said thermally insulating elements in the curable cover layer mortar.

27. Method as claimed in claim 25, wherein arranging the cover layer on the substrate layer comprises largely or completely embedding the tube system in the curable cover layer mortar.

28. Method as claimed in claim 27, wherein arranging the cover layer on the substrate layer comprises largely or completely embedding the tube system in the curable cover layer mortar such that the tube system lies substantially flush with an outward facing surface of the cover layer.

29. Method as claimed in claim 25, the method further comprising arranging a grid substantially parallel to the substrate layer in the layered construction.

30. Method as claimed in claim 29, the method further comprising securing the tube system to the grid.

31. Method as claimed in claim 25, wherein the thermally insulating elements comprise blocks.

\* \* \* \* \*